July 7, 1959

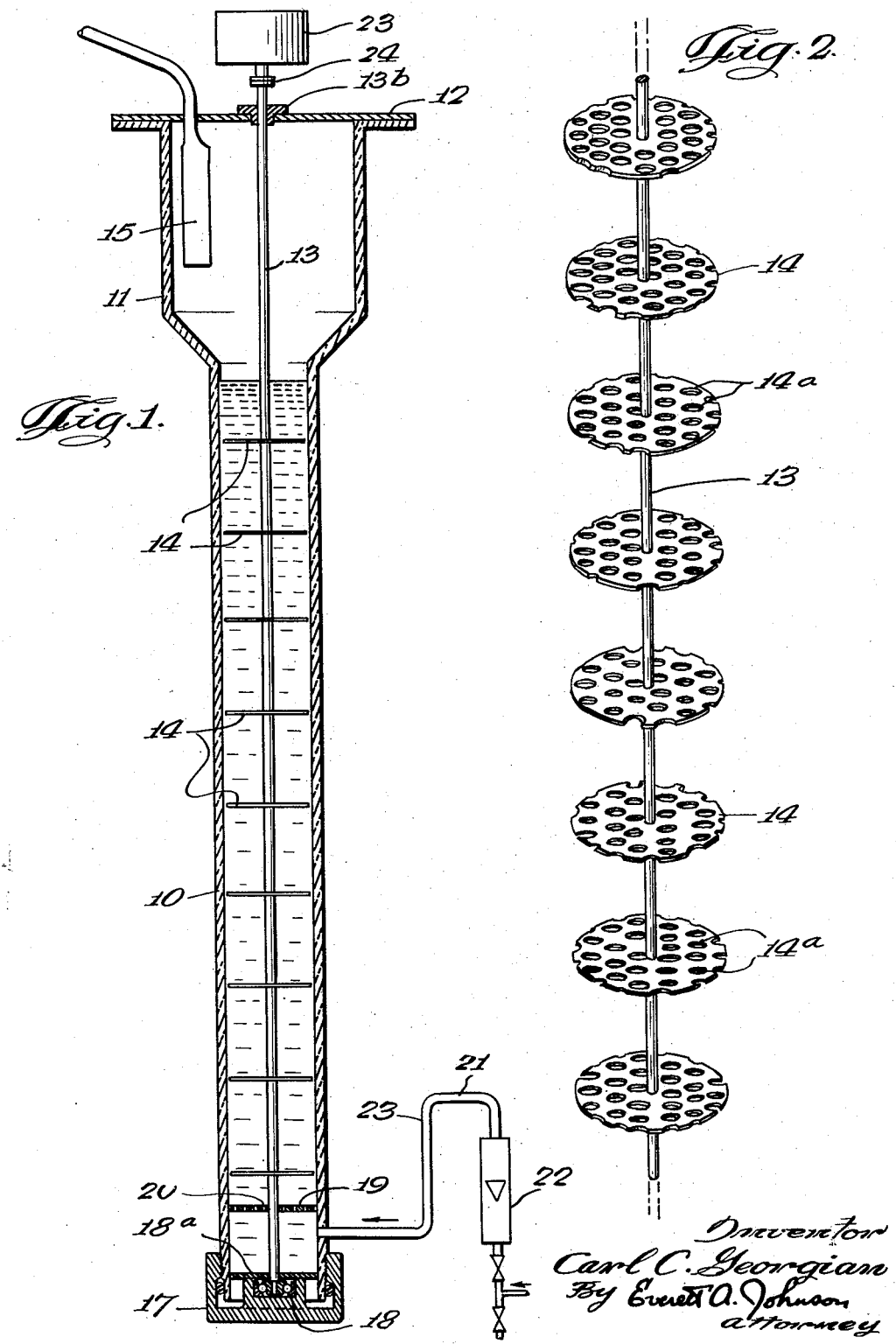

C. C. GEORGIAN 2,893,851

POWDERED CATALYST CONTACTING UNIT

Filed Dec. 29, 1955

Inventor
Carl C. Georgian
By Everett A. Johnson
Attorney

United States Patent Office 2,893,851
Patented July 7, 1959

2,893,851

POWDERED CATALYST CONTACTING UNIT

Carl C. Georgian, La Marque, Tex., assignor to The American Oil Company, Texas City, Tex., a corporation of Texas Application December 29, 1955, Serial No. 556,286

7 Claims. (Cl. 23—288)

The present invention relates to catalytic treatment of gasiform fluids in the presence of powdered solid catalyst wherein the finely divided particles of catalysts are fluidized in an upflow of gasiform fluids.

In the course of development of the catalytic converting arts many "standard" methods of testing have been proposed and utilized and the majority of these methods have served their intended purposes. The testing of finely divided catalysts has become an important and permanent phase of refinery control.

One of the important factors in the successful and economical operation of a commercial fluid catalytic cracking unit is in the accurate determination of the equilibrium catalyst activity and selectivity. An additional factor involves the fluidization characteristics as influenced by the equilibrium particle size distribution.

Catalysts change in particle size distribution in use, there being a tendency to disintegrate and form larger proportions of fines, i.e., particles of from 0 to 20 microns. Such used catalysts are more difficult to fluidize than fresh or replacement catalysts and considerable difficulty is encountered in fluidizing such catalysts in miniature testing units. It is with respect to this problem that my invention is particularly directed. However, it is contemplated that the designing features will find wide utility in commercial contacting systems.

Another important factor is the evaluation of potential feed stocks as to product distribution, contaminants, etc., before actually charging the feed stocks to the commercial plant.

The above factors were given early recognition by the petroleum industry with the result that many catalyst testing units and systems have been evolved. Of the many basic design types, the confined fluidized bed is the more popular because of its simplicity for bench scale work and because its design readily lends itself to operating conditions that give conversion levels comparable to commercial operation. Thus, although this invention relates to an improvement in a catalyst testing unit of the confined fluidized bed type it has applications in commercial fluid bed catalytic units in both the reactor section and the regenerator section.

A primary object of my invention is to provide a fluidized bed testing unit that can satisfactorily handle powdered catalyst containing up to 15% of 0–20 micron material. Ordinarily such catalyst channels so severely that the bed cannot be fluidized.

In accordance with the invention a contacting zone is provided to which the gasiform fluids are introduced at a relatively low inlet point and pass upwardly thereby aerating or suspending the powdered solids in a fluidized phase. At vertically spaced points throughout the contacting chamber the upflowing fluids are repeatedly subdivided by means of a perforated grid which is rotated. Intermediate these spaced vertical points are regions of substantial vertical height wherein the gasiform fluids are free to move upwardly in the fluidized solids phase without constraint.

The horizontally disposed and rotated grids effects a substantially uniform distribution of the gasiform fluids and suspended solids so that the upflowing fluids continuously make contact with the finely divided solids in a uniform manner. Accordingly, the present invention has the advantage of overcoming the previous defects in operation referred to as "channeling" and "slugging" wherein the gasiform fluid tends to pass through the fluidized solids in large bubbles and wherein gases substantially bypass the solids which are in a settled condition. Each of these situations makes for poor contact with the finely divided solids.

It has the further advantages of causing the substantial disruption of large bubbles of gasiform fluid and of any conglomerate particles which may form.

These advantages are obtained by passing the gasiform fluid upwardly through the rotated perforated grids. Thus the present invention contemplates the recurrent and random jetting of gasiform fluids upwardly through the spaced rotated grids whereby optimum contact of the gasiform fluids is made with the fluidized solids phase maintained between the vertically spaced perforated grids.

The advantages of my invention and design features thereof will be described in more detail by reference to preferred embodiments thereof illustrated in the accompanying drawings wherein:

Figure 1 is an elevation view of a contactor;

Figure 2 is an isometric view of the perforated grid assembly; and

Figure 3:
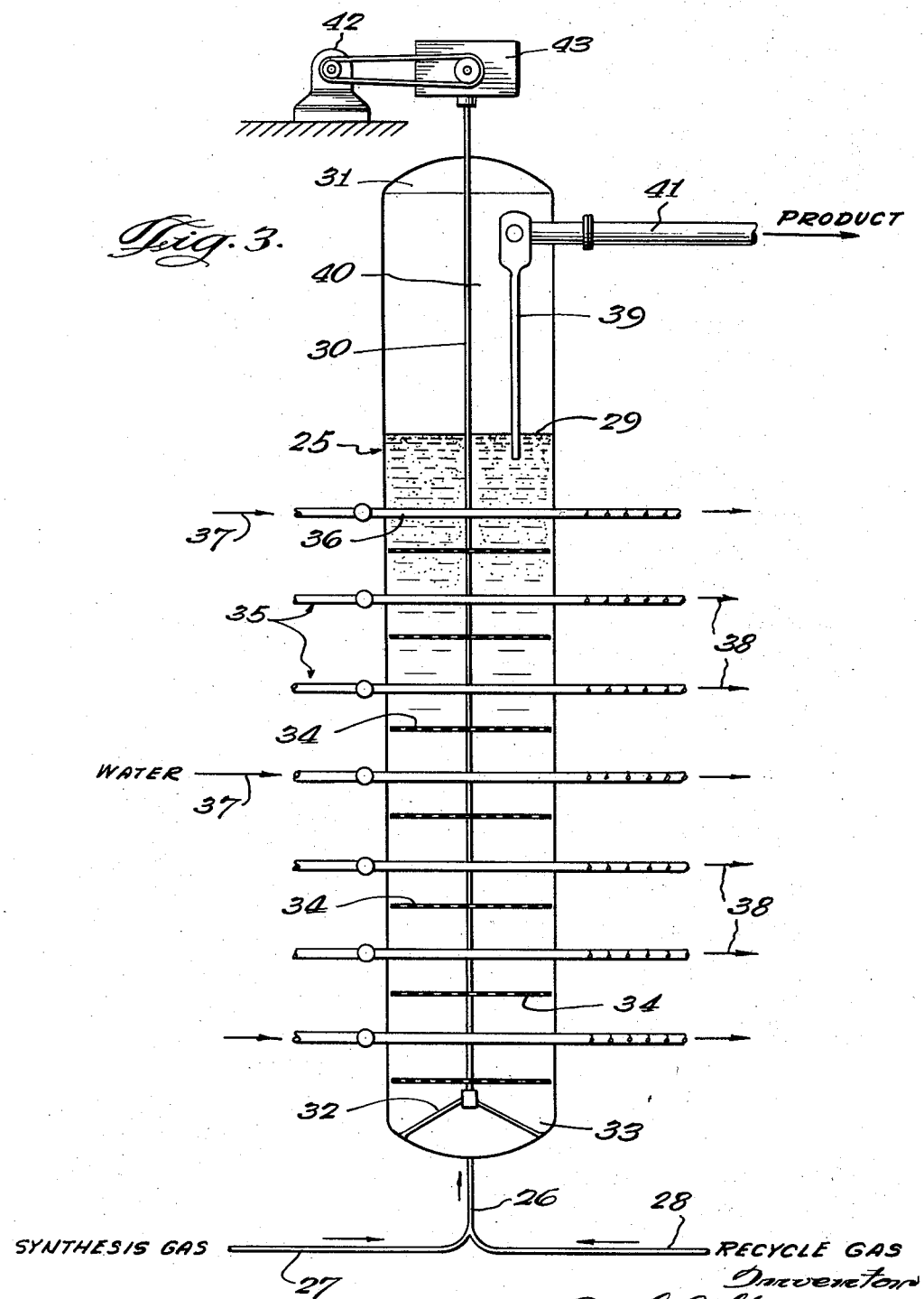
Figure 3 is a schematic elevation of a second embodiment of my invention.

Referring to Figure 1 I have illustrated a laboratory catalyst testing unit embodying a cylindrical contactor chamber 10 composed of a steel tube about 40 inches high and 2 inches in diameter, superposing the contacting chamber 10 is an enlarged calming section 11 which is approximately twice the diameter of the contacting chamber 10 and about 2 diameters high. The upper end of the calming section 11 is closed by plate 12 which supports the upper end of the shaft 13 on which the perforated grid plates 14 are mounted. A bearing 13a is mounted on plate 12 to accommodate shaft 13. A solids separator or filter 15 has a gas vent line 16 through the plate 12. This separator 15 may comprise a cyclone separator, a fritted metal filter or the like.

The lower end of the contacting chamber 10 is closed by a threaded closure member 17 supporting a bearing 18 in which the lower end of the shaft 13 rotates. Plate 18a protects bearing 18 from the reactants and catalyst in contacting chamber 10.

A gasiform fluid distributor 19 extends across the flow area of the contacting chamber 10 and is provided with a bore 20 through which the shaft 13 passes. The fluidizing gas is supplied by valved line 21 through meter 22 into the contacting chamber 10 through the flow distributor 19. A variable speed motor 23 drives the shaft 13 through a coupling 24.

In a preferred embodiment I provide a contactor 10 of about 36 inches in length and having an I.D. of about 2 inches. Horizontal perforated plate baffles 14, also about 2 inches in diameter, are longitudinally dispersed on rod 13 at spacings of about 2 inches, the baffle zone extending from the bottom of the contactor 10 to a height of about 20 inches. The perforated plate baffles 14 comprise circular punched metal discs having 3/16 inch holes on 1/4 inch centers arranged in a staggered pattern giving a 53% open area. Details of the rotated baffle unit are given in Figure 2.

A typical equilibrium catalyst from a fluid catalytic cracking unit may have the following particle size distribution as determined by a Roller analysis:

| | Percent |
|---|---|
| 0–20 microns | 13 |
| 20–40 microns | 30 |
| 40–80 microns | 43 |
| 80+ microns | 14 |

Equilibrium catalyst of such fines content cannot be fluidized in the baffle reactor when the baffle grids are stationary. However, when the perforated baffles are rotated at slow speeds, good fluidization and improved gas solid contacting takes place.

With the baffle system illustrated in the drawings a rotational speed of between about 15 to 60, preferably 30 r.p.m. can be used. At the higher speeds improved gas-solid contacting is obtained but at a sacrifice in the top to bottom catalyst circulation within the fluidized bed.

The perforated plates described above should have at least 50% open area and if it is desired to enhance the function of gas bubble breakup the perforations 14a may be reduced to 1/8 inch and placed on 3/16 inch centers.

The use of rotating perforated plate baffles 14 in the tubular contactor 10 for a confined fluidized bed improves fluidization and gas-solid contacting when employing powdered solids containing high percentage of fines. In other words, the rotating horizontal perforated plate baffles are effective in controling channeling and slugging in dense phase fluidized beds. There is a great improvement in gas solid contacting without any decrease in the catalyst turnover or mixing from top to bottom.

It appears that the rotating horizontal perforated baffles produce a large number of dynamic jets of gasiform fluid from globules of gas that pass upwardly through the fluidized bed. There is substantially no agitation of the bed due to the mechanical rotation of the grid itself.

In Figure 2 I have shown in some detail one form of rotated baffle grids. This unit includes a shaft 13 on which the perforated grids 14 are tack welded in about the same vertical spacing as the diameter of the baffles. In a preferred catalyst testing unit the shaft may comprise a 1/4 inch tube with 2 inch spacing between the 2 inch grid baffles. The perforations 14a in the grids are 3/16 inch on 1/4 inch centers.

In Figure 3 I have illustrated an apparatus for the synthesis of hydrocarbons by the catalytic reduction of carbon monoxide with hydrogen. The reactor 25 is supplied through conduit 26 with a synthesis gas from line 27 and a recycle gas in line 28. The gases pass vertically upward within the reaction vessel 25, suspending a mass of finely divided catalyst preferably in a dense fluidized phase extending to a level 29. The reaction chamber 25 contains a central shaft 30 supported at its upper end by the top 31 of the reactor 25 and at its lower end by a tripod 32 connected to the lower concave wall 33 of the reactor 25.

This central shaft or support 30 carries a plurality of fixed vertically spaced radially extending plates 34 which are perforated to provide an open flow area of at least 50% of the total flow area of the reactor 25.

The catalyst may comprise any finely divided or powdered solid contacting material capable of being aerated or suspended as a fluidized solids phase. In connection with the hydrocarbon synthesis process just referred to the catalyst is advantageously one of the typical contacting materials such as activated, promoted and conditioned iron of appropriate particle size, i.e., 100 mesh or finer. Typical activators and promoters may be incorporated in the catalyst.

The linear rate of gas flow is that appropriate to maintain the desired condition of fluidization. Usually for powdered iron catalysts, this involves a vertical upward linear gas velocity through the reaction vessel of about 0.5 to about 3 feet per second.

Reverting to the reactor 25 I provide a plurality of banks 35 of cooling tubes 36 having an inlet 37 for liquid coolant from any suitable source and outlets 38 for the coolant and vapors. When water is the coolant liquid the product may be high pressure steam. In any event, the coolant or vapors thereof are withdrawn by means of outlet pipe 38 at any suitable rate and pressure whereby removal of the exothermic heat of reaction at a controlled rate permits maintaining the fixed internal temperature within the reactor 25.

The banks 35 of cooling tubes 36 are preferably disposed within the reactor 25 intermediate the rotating perforated circular discs 34.

The apparatus is preferably operated to raise the level of the fluidized catalyst phase to a point above the topmost baffle 34 in the reactor 25. The product gases are withdrawn by way of a cyclone separator 39 in the catalyst disengaging space 40 at the upper end of the reactor 25 substantially above the topmost baffle 14. From the separator 39 the product emerges through outlet conduit 41 and may be processed by condensation and separation for the recovery of solid and liquid and reaction products. Normally, gaseous products may be recycled in whole or in part to the inlet conduit 26 by line 28.

Iron synthesis catalyst tends to break down rapidly under synthesis conditions to much smaller particle size with subsequent loss in fluidization. The use of the rotating perforated plate baffles will allow good fluidization to continue over longer operating periods without changing the vertical velocity of the reactants.

Further, iron synthesis catalysts have strong carbonization tendencies especially where "hot" spots develop. The improved gas-solid contacting efficiency brought about by the dynamic gas jets above the rotating perforated plate baffles prevents high local concentrations of $H_2$ and CO due to channeling and thereby minimize the development of hot spots in the catalyst bed.

The improved gas-solid contacting efficiency also permits equal or greater conversions at higher space velocities and accordingly good fluidization can be continued over longer operating periods without sacrificing conversions.

The reactor 25 may have a diameter up to about 10 feet. Power requirements are low because of the slow rotational speed and because the plates 34 more or less "float" within the fluidized bed without any substantial agitation thereof. Normal operating procedure is to partially fluidize the bed and then begin rotating the baffles 34 at the lowest possible speed and then bringing the baffles up to designed speed as fluidization becomes complete.

From the above it is apparent that the present invention not only assures uniformity of fluidization of finely divided solids having relatively large proportions of fines but in addition enhances heat transfer by providing a good fluidization in the region of the banks of cooling tubes.

The rotating baffles are proposed for use in the fluidized iron hydrocarbon synthesis catalyst operations because of the importance of high conversions and relatively small reactor sizes that are conventionally used. Likewise, the rotated baffles may be used in the stripper section of a fluid catalytic unit where good gas-solid contacting is imperative.

Although I have described my invention by reference to separate embodiments thereof it should be understood that this is by way of illustration only. Further, it is contemplated that modifications therein and in the mode of operation can be made by those skilled in the art in view of my description without departing from the spirit and scope of the invention.

What I claim is:

1. An apparatus adapted to the contacting of gases and fluidized solids which comprises a vertically elongated contacting chamber adapted to contain a fluidized body of the finely divided solids, conduit means for introducing gasiform fluids into the lower end of said chamber, conduit means for withdrawing gasiform fluids from the upper end of said chamber, longitudinally disposed shaft means extending within said chamber, said shaft being provided with radially extending perforated planar circular discs which have a lateral extent corresponding substantially to the cross-sectional flow area of the chamber, and mechanical means for imparting rotary motion to the shaft and perforated discs, said discs when rotated providing recurrent and random jetting of upflowing gasiform fluid at a plurality of levels in said chamber.

2. Apparatus adapted to the contacting of finely divided solids having a relatively large proportion of fines, which comprises vertically elongated contacting chamber means adapted to confine a fluidized body of such finely divided solids, conduit means for introducing contacting fluids into a lower portion of said chamber, means for separating contacting fluids and solids in an upper portion of said chamber, conduit means for withdrawing fluids from the said upper portion of said chamber, rotatable transverse perforated circular planar discs longitudinally spaced from each other throughout that portion of the chamber occupied by the body of fluidized solids, and drive means exterior of said contacting chamber for rotating said discs in unison thereby providing a multiplicity of recurrent and random dynamic jets of contacting fluid from globules of gas passing upwardly through the fluidized solids.

3. The combination of a vertically elongated chamber for maintaining a fluidized body of pulverulent solid material, means for introducing gasiform fluid under pressure into the chamber in a lower portion thereof to render the material in a fluidized phase, means for repeatedly resuspending the body of solids within the chamber at a plurality of levels, said last-mentioned means including a plurality of vertically spaced rotatable perforated circular planar grids, said grids providing recurrent and random jets of upflowing gasiform fluid but having substantially no agitating or propelling effect on the fluidized solids due to the mechanical rotation of the grids themselves, a rotatable shaft means supporting and rotating said grids, means exterior of said chamber adapted to drive said rotatable shaft, means for withdrawing gasiform fluids from said chamber and for knocking back the suspended solids into said fluidized phase, said perforated grids comprising relatively thin circular plates which are substantially coextensive with the cross-sectional flow area of the contacting chamber and having a free flow area of about 50% thereof, such free flow area being provided by a plurality of staggered perforations of between about 0.125 inch and 0.1875 inch on about 0.25 inch centers.

4. An apparatus adapted for use in enhancing the contacting of fluidized solids and gasiform fluids in a vertically elongated chamber which comprises in combination longitudinally disposed rotatable shaft means extending within a contacting chamber, and a plurality of perforated rotatable planar non-propelling discs mounted on said shaft in parallel planes perpendicular to the axis of rotation and longitudinally spaced from each other, said discs having a lateral extent corresponding substantially to the cross sectional flow area of the contacting chamber and being characterized by providing a multiplicity of recurrent and dynamic jets of gasiform fluid at each of the spaced levels.

5. An apparatus adapted to the contacting of gases and fluidized solids which comprises a vertically elongated contacting chamber adapted to contain a fluidized body of the finely divided solids, conduit means for introducing gasiform fluids into the lower end of said chamber, conduit means for withdrawing gasiform fluids from the upper end of said chamber, longitudinally disposed shaft means extending within said chamber, said shaft being provided with radially extending perforated planar circular discs which have a lateral extent corresponding substantially to the cross-sectional flow area of the chamber, mechanical means for imparting rotary motion to the shaft and the perforated discs, said discs when rotated providing recurrent and random jetting of upflowing gasiform fluid at a plurality of levels in said chamber, the said rotatable perforated discs having a flow area of at least 50% of the total area of the disc, such flow area being provided by a plurality of staggered perforations.

6. An apparatus adapted for use in enhancing the contacting of fluidized solids and gasiform fluids in a vertically elongated chamber which comprises in combination longitudinally disposed rotatable shaft means extending within a contacting chamber, a plurality of perforated rotatable planar non-propelling discs mounted on said shaft in parallel planes perpendicular to the axis of rotation and longitudinally spaced from each other, said discs having a lateral extent corresponding substantially to the cross-sectional flow area of the contacting chamber and being characterized by providing a multiplicity of recurrent and dynamic jets of gasiform fluid at each of the spaced levels, and a plurality of heat exchange units, one such unit being interposed each adjacent pair of rotatable discs, pairs of such units defining the top and bottom of a chamber containing such rotatable planar non-propelling disc.

7. The apparatus of claim 4 wherein the perforated discs have a free flow area of at least 50% of the total area of the disc, contain perforations of between about 0.125 inch and 0.1875 inch on about 0.1875 inch to 0.25 inch centers, and are rotated at a speed of between about 15 to 60 r.p.m.

References Cited in the file of this patent

UNITED STATES PATENTS

| | | |
|---|---|---|
| 279,145 | Gandolfo | June 12, 1883 |
| 2,389,399 | Alther | Nov. 20, 1945 |
| 2,542,587 | Smith | Feb. 20, 1951 |
| 2,635,949 | Fenske | Apr. 21, 1953 |
| 2,640,845 | Beck | June 2, 1953 |
| 2,718,491 | Green | Sept. 20, 1955 |
| 2,783,187 | Odell | Feb. 26, 1957 |